United States Patent
Ono et al.

(10) Patent No.: US 7,620,299 B2
(45) Date of Patent: Nov. 17, 2009

(54) DATA RECORDING DEVICE FOR RECORDING DATA IN BASIC RECORDING UNITS

(75) Inventors: Hiroaki Ono, Mito (JP); Tatsuya Ishitobi, Kawasaki (JP); Toshifumi Takeuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1064 days.

(21) Appl. No.: 11/150,790

(22) Filed: Jun. 10, 2005

(65) Prior Publication Data

US 2005/0232604 A1 Oct. 20, 2005

Related U.S. Application Data

(63) Continuation of application No. 10/126,325, filed on Apr. 19, 2002, now Pat. No. 6,993,250.

(30) Foreign Application Priority Data

Jun. 27, 2001 (JP) ............................. 2001-193979
Feb. 19, 2002 (JP) ............................. 2002-040914

(51) Int. Cl.
*H04N 5/91* (2006.01)

(52) U.S. Cl. ...................................... 386/112; 386/125

(58) Field of Classification Search .................. 386/46, 386/95, 96, 98, 109, 111, 112, 125, 126
See application file for complete search history.

(56) References Cited

U.S. PATENT DOCUMENTS 6,125,468 A 9/2000 Kim et al.
6,389,223 B1 5/2002 Aotake
6,538,962 B2 3/2003 Hyun

FOREIGN PATENT DOCUMENTS

| JP | 09-035270 | 2/1997 |
| JP | 2000-011383 A | 1/2000 |
| JP | 2000-207838 A | 7/2000 |
| JP | 2001-143373 A | 5/2001 |

*Primary Examiner*—Huy T Nguyen
(74) *Attorney, Agent, or Firm*—Townsend and Townsend and Crew LLP

(57) ABSTRACT

When, in the course of recording data to a disk for each basic recording unit, the recording is stopped in the middle of a basic recording unit, data of the basic recording unit of the recording that was stopped remain held in memory. When recording resumes, the recording operation is restarted sequentially from the remaining data held in memory from the position at which recording was stopped. When the remaining data cannot be recorded, dummy data are recorded instead and playback is performed, skipping the dummy data section.

2 Claims, 4 Drawing Sheets

FIG.2

(a) NORMAL RECORDING OPERATION

| (1) RECORDING DATA | A | B | C | D |
|---|---|---|---|---|
| (2) MEDIA RECORDING DATA | 1 | 2 | 3 | 4 |
| (3) PLAYBACK DATA | A | B | C | D |

(b) RECORDING OPERATION DURING VIBRATIONS (FIRST)

HELD IN MEMORY FROM B ONWARD

| (1) RECORDING DATA | A | B' | → | B | C | D |
|---|---|---|---|---|---|---|
| (2) MEDIA RECORDING DATA | 1 | 2' | 2" | 3 | 4 | |
| (3) PLAYBACK DATA | A | | B | C | D | |

(c) RECORDING OPERATION DURING VIBRATIONS (SECOND)

HELD IN MEMORY FROM B ONWARD    C THROUGH E ARE DELETED

| (1) RECORDING DATA | A | B' | → | B | F | G |
|---|---|---|---|---|---|---|
| (2) MEDIA RECORDING DATA | 1 | 2' | 2" | 3 | 4 | |
| (3) PLAYBACK DATA | A | | B | F | G | |

FIG.3
(a) RECORDING OPERATION DURING VIBRATIONS (THIRD)
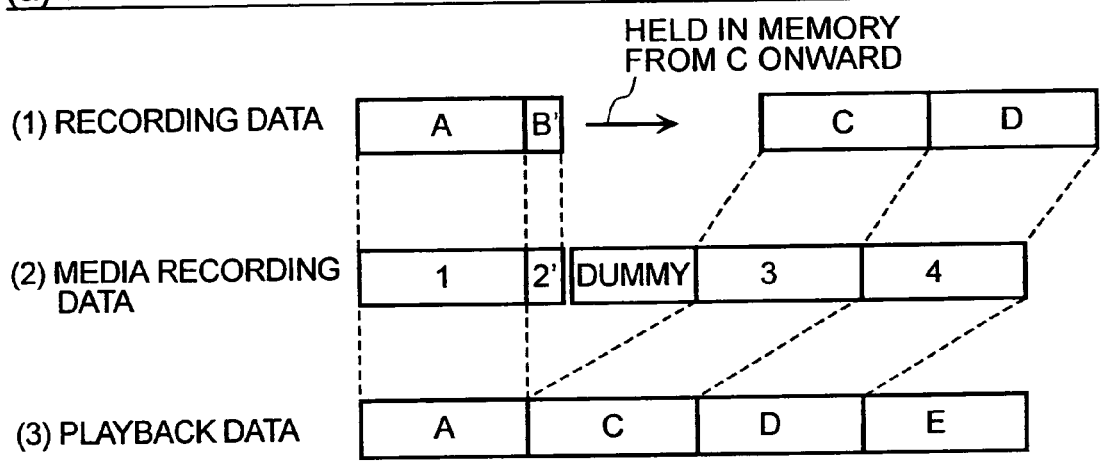
(b) RECORDING OPERATION DURING VIBRATIONS (FOURTH)
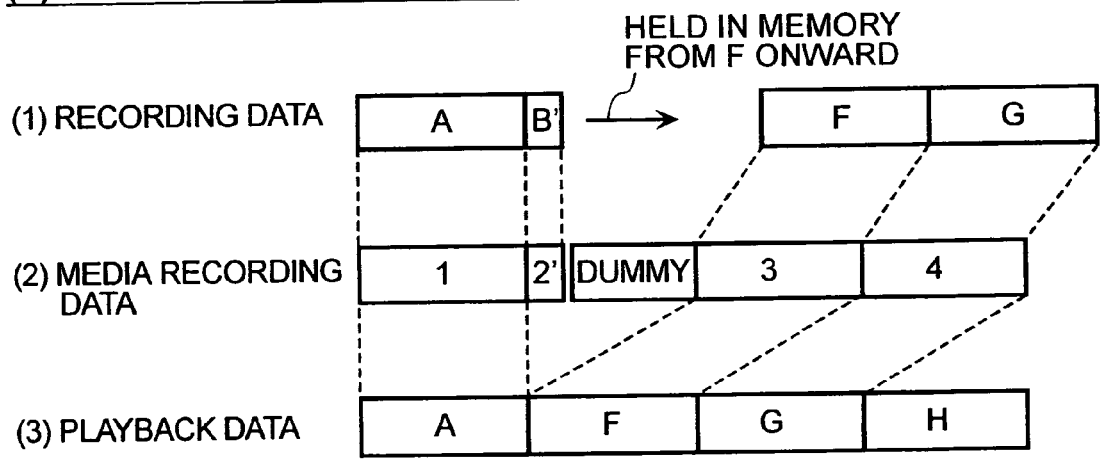

DATA RECORDING DEVICE FOR RECORDING DATA IN BASIC RECORDING UNITS

CROSS-REFERENCE TO RELATED APPLICATION(S)

This is a continuation of U.S. application Ser. No. 10/126,325, filed Apr. 19, 2002, and entitled "Data Recording Device for Recording Data in Basic Recording Units," which application claimed priority from Japan Patent Application No. 2001-193979, filed Jun. 27, 2001, and Japan Patent Application No. 2002-040914, filed Feb. 19, 2002.

BACKGROUND OF THE INVENTION

The present invention relates to data recording technology for recording data to disk-type recording media such as an optical disk, and more particularly to data recording technology for recording moving images imaged by imaging means and sound from sound collecting means as data to an optical disk.

A CD player for playing back digital audio data from compact disks (CD) is an example of a disk playback device for playing back digital signals from a disk-type recording medium. Using an optical head, the CD player obtains the playback signal by reading the differences in reflectance of the pits and lands, formed on the disk in advance.

A disk playback device, using an optical head for playing back signals from a disk, such as this CD player, has better features, such as random access, than playback devices using tape-type recording media. Further, because the recording media and the optical heads are not in contact, there is no deterioration of the recording medium and reliability is very high.

However, such disk players have problems that make it impossible to read and reproduce the recorded data correctly (for example, the sound will drop out when reproduced with a CD player) because dust and defects on the disk or electrical noise and vibration reduce the signal quality of the optical heads reading the signal from the disk. This type of problem also occurs in disk recording devices. In disk recording devices, dust and defects on the disk or electrical noise and vibrations make it impossible to normally extend the recording signal from the optical heads to the disk, and a proper recording cannot be made on the disk.

Conventionally, these problems have been resolved with a "retry operation" wherein locations (tracks) to which the optical heads could not record are scanned again and the same recording signal is re-recorded.

With a retry operation, the recorded data can be recorded on a disk with as high fidelity as is possible because the head returns to the location directly preceding the location that could not be recorded and carries out correct recording once again. As a result, these means are effective for recording media which can be overwritten any number of times. However, for disk media on which data can be recorded one time only, such as CD-R (compact disk-recordable) and DVD-R (digital versatile disc-recordable), the retry method is not effective. A good recording cannot be made to a disk when correct recording has not been made to locations which have been written to once because there can be no correction re-recording. Patent application JP 2001-171890 has already been filed as related art.

BRIEF SUMMARY OF THE INVENTION

It is an object of the present invention to provide a data recording device with high fidelity, which resolves the aforementioned problems in the prior art, and wherein problems such as image breakup or sound breakup are unlikely to occur.

When recording errors are detected at the time of recording with the present invention, recording is halted at once, even in the middle of recording a basic recording unit, and the recording data, including at least the information in the basic recording unit that was interrupted, are held in memory. After the recording error is eliminated or when re-recording is commanded, the head returns once more to the recording position directly preceding the place where the recording error was detected and attempts the recording operation from the location at which the recording of the basic recording unit was interrupted.

With the present invention, even when recording is halted for any reason while recording the data in a basic recording unit, the remaining data in that basic recording unit can be consecutively recorded in a retry from the position directly preceding the place where the recording was halted. Furthermore, even when the aforementioned recording stoppage time is prolonged and the memory capacity for temporarily holding recording data looks like it may be exceeded, data in the basic recording unit at the time when recording was halted remains held therein. Therefore, after recording starts, the remaining data in the recording unit can be consecutively recorded from the recorded portion of the disk. As a result, when these locations are played back there is no disruption in the image or sound.

Further, in the present invention, when normal recording is not possible, even when a re-recording operation has been attempted one or more times, correct recording at the position is abandoned and the head moves to the next recording position to continue recording. In this case, dummy data that cannot be corrected are recorded to the location, where the recording operation was not possible, instead of recording data with added ECC correction codes. In this case, playback of the location at which the dummy data was recorded causes disruption of the image and sound, in the case of audio or video recording, because error correction is not possible. Therefore, when correction is not possible, playback of data in the recording unit is skipped. Disruption of the image or sound can occur only with difficulty because of this skipping during playback.

BRIEF DESCRIPTION OF THE DRAWINGS

FIG. 2 illustrates the recording and playback operation of the video camera embodiment;

FIG. 3 illustrates the recording and playback operation of the video camera embodiment.

DETAILED DESCRIPTION OF THE INVENTION

The preferred embodiments of the present invention are explained below using the drawings.

Figure 1:
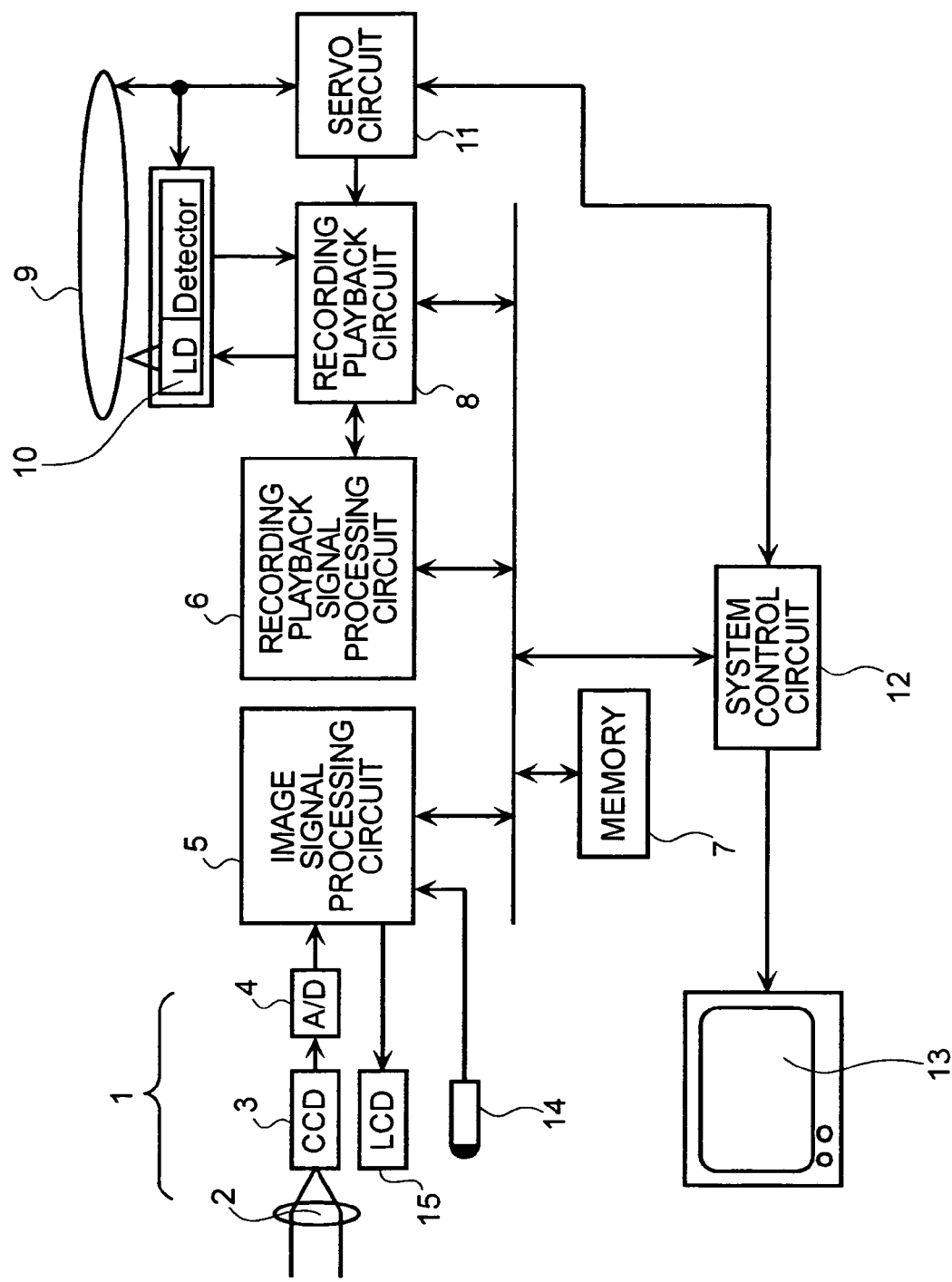
FIG. 1 shows the configuration of the system for a video camera embodiment of the present invention.

FIG. 1 is a block diagram showing the general configuration of a video camera embodiment of the data recording device of the present invention. Moreover, portions shown as circuits in this drawing do not have to be realized with circuits and may be replaced by software, such as a program.

The imaging portion 1 comprises an imaging optical system 2, a charge coupled device (CCD) 3, and an analog-digital (AID) converter 4. The object image is imaged on CCD 3 by imaging optical system 2, an image signal is obtained from CCD 3, and this signal is digitized and output by A/D converter 4.

An image signal processing circuit 5 carries out processing to convert the image signal from the imaging portion 1 imaged data. Image signal processing circuit 5 also processes audio information signals output from a microphone 14, which is a representative means for converting sound to an electrical signal. During playback, image signal processing circuit 5 carries out processing to convert image data from a recording playback signal processing circuit 6, discussed below, to an image information signal for display output. Furthermore, image signal processing circuit 5 carries out processing to convert audio data from recording playback signal processing circuit 6, to an audio information signal for audio output.

In the case of a video camera, the image data and audio data, which are the recording data, are continuously processed by image signal processing circuit 5. The image and sound quality are determined by the processing capacity of image signal processing circuit 5. The transfer speed of the data sent from image signal processing circuit 5 to recording playback signal processing circuit 6 is determined by the processing capacity of the recording playback signal processing circuit.

Recording playback signal processing circuit 6 carries out processing such as encoding/decoding processing, modulation/demodulation processing, and ECC (error correction code) addition/error correction processing, in order to convert the image data, including audio data (processed by image signal processing circuit 5 and accumulated in memory 7), to recording data in a format for recording to a disk-type recording medium 9, and to convert the data played back from recording medium 9 to image data (including audio data).

The units in which data are recorded to disk are such that the basic recording unit is determined in the specifications, but in some cases, recording to disk-type recording medium 9 cannot be completed and is interrupted during basic unit recording. The transfer speed for recording to disk or for playback is determined by the processing capacity of recording playback signal processing circuit 6, the processing capacity of recording playback circuit 8, the rotation speed of the disk, and the like.

The image data (including audio data) from image signal processing circuit 5 is temporarily stored in memory 7. In the case where the transfer speed of the image data or audio data from image signal processing circuit 5 is faster than the speed of recording to disk-type recording medium 9, or in the case where recording to disk-type recording medium 9 is interrupted, as discussed above, memory 7 accumulates the recording data that are being recorded to disk-type recording medium 9, in the aforementioned basic recording units. As a result, recording to disk-type recording medium 9 must be accomplished before the quantity of recording data accumulated in the memory 7 exceeds the memory capacity.

Playback circuit 8 converts the digital data processed by recording playback signal processing circuit 6 to an analog signal and drives a/an LD 10 in optical head 10, represented by a semiconductor laser, on the basis of this analog signal. In addition, the detector in optical head 10 converts the received light to an analog signal and outputs this signal.

A servo circuit 11 carries out the control necessary when optical head 10 is recording data to disk-type recording medium 9; for example, focus and tracking control for controlling the actuator of the optical head 10, rotation control of the disk for controlling the spindle motor that rotates the disk-type recording medium, seek control for controlling the address location of the optical head 10, and the like. Because the servo controls are known items in the art, a detailed explanation is omitted.

The liquid crystal display (LCD) 15 functions as an image display means for displaying images from imaging portion 1.

A display device 13 can be connected to the aforementioned video camera and can show an image reproduced from media recording data recorded on disk-type recording medium 9.

During data playback, image data played back from disk-type recording medium 9 is received by the detector in optical head 10, and data converted to an analog signal by recording playback circuit 8 are temporarily accumulated in memory 7 as played back recording data. Thereafter, these data are converted to the original image data by recording playback signal processing circuit 6 and displayed on LCD 15 through image signal processing circuit 5.

System control circuit 12 is a control microcomputer for comprehensive control of the entire device and for control of each portion of the device discussed above.

Next, the process followed when the video camera shown in FIG. 1 is both incorrectly recording to disk-type recording medium 9 and not playing back is explained using FIGS. 2 and 3. For this discussion, presuppose the following: (1) The stoppage of data recording in the middle of a unit is recognized by system control circuit 12 through recording playback circuit 8 or servo circuit 11. The determination of whether data recording can be restarted is made by system control circuit 12 based on information obtained from recording playback circuit 8 or servo circuit 11. (2) In the present embodiment, the basic recording unit is an ECC block unit. (3) The recording position on disk-type recording medium 9, on which a basic recording unit of data is recorded can be easily specified by using optical head 10 to read the address signal, or the like, recorded in advance on the subject disk.

FIG. 2 (a) shows the normal recording operation. As shown in (1), recording data A through D in the basic recording units, generated by image signal processing circuit 5, are temporarily held in memory 7 and are then converted to media recording data by recording playback signal processing circuit 6 as shown in (2). After that, the media recording data are recorded sequentially from 1 to 4 to disk-type recording medium 9. As shown in (3), media recording data 1 to 4 recorded on disk-type recording medium 9 are converted from playback data A through D and played back by recording playback signal processing circuit 6 and image signal processing circuit 5.

FIG. 2 (b) and FIG. 2 (c) show the recording operation when recording of data in a basic recording unit is interrupted as a result of the servo deviating and the LD of the optical head 10 suddenly turning off as the result of an external factor such as vibration.

FIG. 2 (b) shows the recording operation when the period from recording interruption recording resumption is shorter than the time it takes for recording data to accumulate up to the threshold value in memory 7. When the recording of media recording data to disk-type recording medium 9 is interrupted due to an external factor (recording at the B' location is interrupted, the 2' location in the media recording data), information B at that location is held without alteration in memory 7, under the control of system control circuit 12. When recording of media recording data has becomes possible once more, optical head 10 is repositioned by servo circuit 11, under he control of system control circuit 12, to the position where recording was interrupted. Thereafter the remaining information 2", excluding the information 2' of the already recorded portion, is recorded from the position to which the optical head was repositioned. Afterwards, recording is carried out in sequence. In effect, the recording data C, D accumulated in memory 7 are converted to media data 3, 4 by recording playback signal processing circuit 6 and are recorded on the disk-type recording medium.

In the case of media which can be recorded only once such as DVD-R and CD-R media, and when recording is interrupted once in the middle of a basic recording unit, it is necessary to write information from the middle of a unit at the time of re-recording, because it is not possible to overwrite a location which is already recorded. In the case of recording from the middle of a unit, a recording linking portion (shaded portion in the drawing) occurs and it is either impossible to record at the linking portion, or the recording clock is disrupted, but sufficient correction is possible because that location is within a very small range. Accordingly, even when with record-once media or an interruption in the middle of recording a basic recording unit, disruption in the image or a break in the sound can be prevented.

FIG. 2 (*c*) shows the recording operation when the period from recording interruption to recording resumption is longer than the time in which recording data accumulate up to the threshold value of memory 7. Because basically the same operation is carried out as in FIG. 2 (*b*), this explanation concerns the differences. When the recording of media recording data to disk-type recording medium 9 is interrupted due to an external factor (recording is interrupted at the location of the recording data B', the 2' location in the media recording data), information B of that location is held unchanged in memory under the control of system control circuit 12. When recording is stopped for a long period and the information accumulated in memory 7 has passed a certain threshold value, the information in memory 7 is removed in the order it was entered (in this drawing, recording data C-E), and new information F, G is held. At this time, however, information B of the basic recording unit for the location at which recording stopped is not deleted. When recording is restarted, the head is repositioned at the position where recording was interrupted. Thereafter, the remaining information 2", excluding the already recorded portion, is recorded from that repositioning position. Thereafter, the deleted information is recorded in the order in which it was removed. In effect, recording data F, G accumulated in memory 7 is converted to media recording data 3, 4 by recording playback signal processing circuit 6 and is recorded on disk-type recording medium 9.

The same results as in the recording operation shown in FIG. 2 (*b*) are also attained with this recording operation. Furthermore, because data are sequentially removed starting with the oldest data and new data are accumulated and can be recorded to the recording medium, this process/recording operation offers improved convenience for the user who wants to have the newest data remain on the recording media.

FIG. 3 (*a*) and FIG. 3 (*b*) show the case of a recording operation where there is damage or dust on a rewritable disk, such as a DVD-RAM (digital versatile disk-random access memory) or DVD-RW (digital versatile disc-rewritable), and there are portions that cannot be recorded although retry operations have been carried out several times. In this figure, the media recording data were recorded up to 2' on disk-type recording medium 9 and recording was stopped at that location.

FIG. 3 (*a*) shows the recording operation when the period from recording interruption to recording resumption is shorter than the time by which the recording data accumulate up to the threshold value in memory 7. Because basically the same operation is carried out as in FIG. 2 (*b*), this explanation concerns differences. In FIG. 3 (*a*), when the remaining data 2" cannot be recorded, as in FIG. 2 (*b*), even though recording is restarted, dummy data (dummy) that cannot be corrected are recorded from the middle of the recording unit under the control of system control circuit 12, without recording the remaining data 2" as recording data with added ECC correction codes. Thereafter, information remaining in memory is recorded sequentially. In effect, the recording data C, D accumulated in memory 7 are converted to media recording data 3, 4 by recording playback signal processing circuit 6 and are recorded on disk-type recording medium 9. In this case, because the playback of the location at which dummy data were recorded cannot undergo error correction, there is disruption of the image and sound, f image and sound have been recorded. Accordingly, when correction is not possible, the playback of data in that recording unit is skipped. In effect, in the process where the media recording data are converted to playback data by recording playback signal processing circuit 6, the portion of the basic recording unit comprising 2' and dummy data, from among the media recording data, is skipped and converted to playback data in the order of A, C, and D.

With this type of recording operation, disruption of the image and sound occurs with difficulty during playback, because dummy data are recorded to the portion which could not be recorded and the dummy data portion is skipped during playback.

FIGS. 3 (*b*) shows the recording operation when the period from recording interruption to recording resumption is longer than the time in which recording data accumulate up to the threshold value in memory 7. Because basically the same operation is carried out as in FIG. 2 (*b*), this explanation concerns the differences. When recording is stopped for a long period of time and the information in memory 7 has passed a certain threshold value, the information in the memory is removed sequentially, the oldest data first (recording data C-E), and new information F, G is accumulated. When the remaining data 2" cannot be recorded even when recording is restarted, dummy data (dummy) that cannot be corrected are recorded from the middle of the recording unit, without recording the remaining recording data with added ECC correction codes. Thereafter, deleted information is recorded in the order in which it was removed. In effect, recording data F, G accumulated in memory 7 are converted to media recording data 3, 4 by recording playback signal processing circuit 6 and are recorded on disk-type recording medium 9. During playback, the portion of the basic recording unit comprising 2' and dummy data is skipped and data are played back in the order of A, F, and G. In effect, in the process where the media recording data are converted to playback data by the recording playback signal processing circuit 6, the portion of the basic recording unit comprising 2' and dummy data, from among the media recording data, is skipped and data are converted to playback data in order of A, F, and G.

System control circuit 12, controlling recording playback signal processing circuit 6, makes the determination of whether to skip and not play back the data in the aforementioned basic recording unit. In the decision method, system control circuit 12 determines that recording playback signal processing circuit 6 cannot make corrections, depending on the recording of the aforementioned dummy data, and causes recording playback signal processing circuit 6 to skip playback of the pertinent portions. Alternatively, information for determining whether to skip playback is embedded in the dummy data and the determination of whether to skip playback is made according to that information played back by recording playback signal processing circuit 6.

Figure 4:
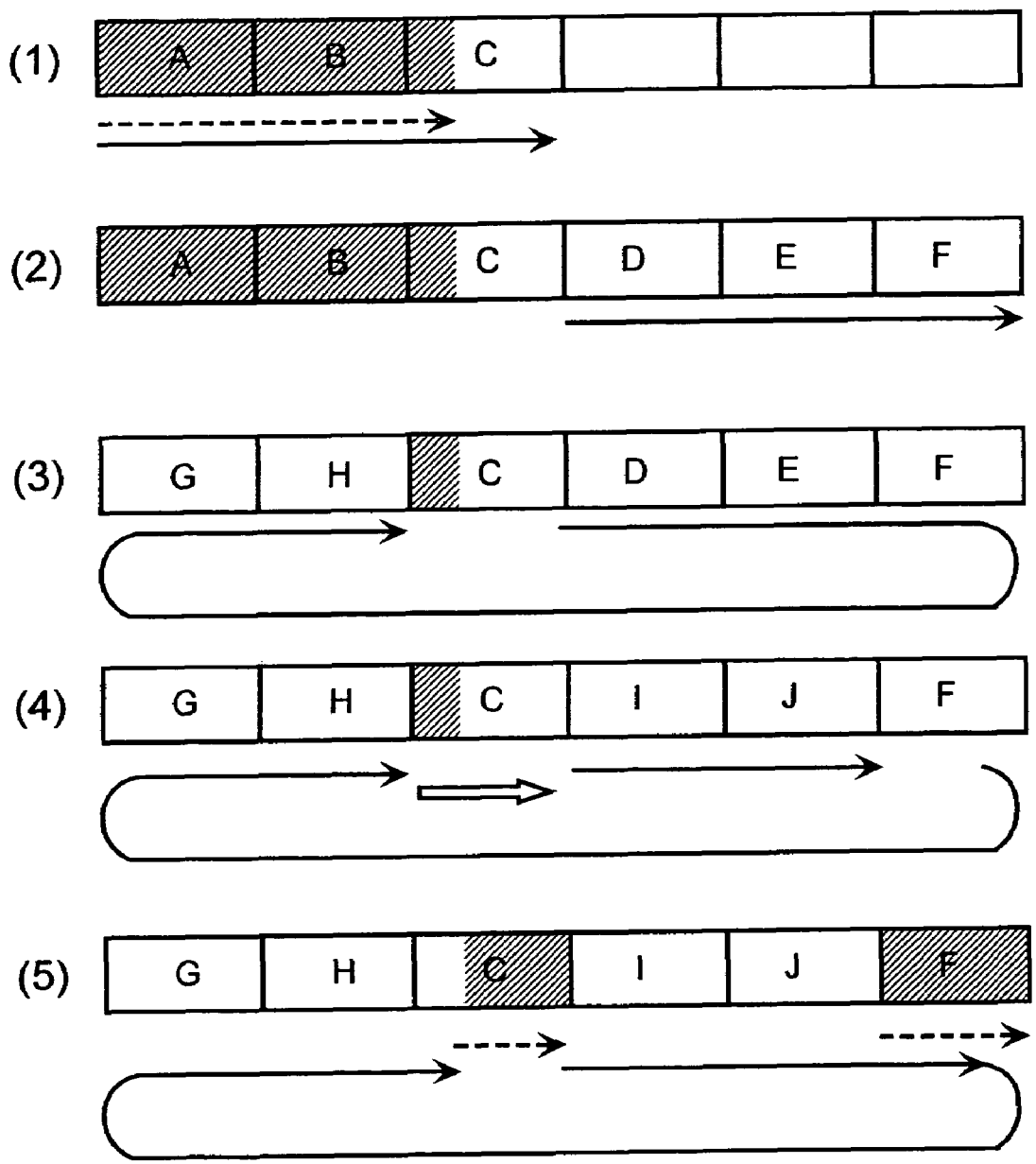
FIG. 4 illustrates the recording and playback operation in the temporary holding memory of the video camera embodiment.

FIG. 4 shows the state of recording and deleting data in basic recording units temporarily stored in memory 7. The allowable capacity of the memory is six basic recording units in this case, and the memory basically employs a storage system such as a ring buffer. As a result, when storage of further items becomes necessary after storage from A to F, A is deleted and G is newly stored. Normally, as shown in FIG. 4 (1), temporary storage is carried out in the order of A, B, C. At this time, when recording to the disk is stopped in the middle of the C storage portion (shaded area of the drawing), D, E, and F are then stored (FIG. 4 (2)). When recording is restarted, recording to disk is started sequentially from a location other than where recording stopped in the middle of the shaded C portion. When the recording stoppage time is prolonged, as in FIG. 4 (3), A and B which were already recorded to disk are deleted from memory and G and H are newly stored. As shown in FIG. 4 (4), even when the recording stoppage becomes lengthy and the removal of the C portion seems necessary, C is held unchanged in memory and, instead, items D and E are deleted in order and then I and J are newly stored. In FIG. 4 (5), when it has finally become possible to restart recording, the remaining portion of C area in at which recording was stopped in the middle (shaded area in the drawing) is recorded to disk, and F and then G and H are consecutively recorded to disk.

The embodiment discussed above has been explained using a video camera as an example, but the present invention is not limited to video cameras and may also be applied to sound recorders, portable information terminals (PDA), PCs, or the like.

In the present invention, as explained above, even when recording is stopped in the middle of a basic recording unit of data, the remaining data of the basic recording unit can then be recorded with a retry at a position that follows immediately after the position at which recording stopped. In addition, for example, the basic recording unit of data at the recording stoppage remains in memory even when the recording stoppage time is prolonged and the memory capacity for temporarily holding recording data appears to be exceeded. As a result, when recording is restarted, the remaining data of the basic recording unit are recorded to the disk at a position immediately following the already recorded portion, and, therefore, it is difficult for disruption of the image or sound to occur when these locations are played back.

What is claimed is:

1. A data recording/playback device comprising:
   image signal processing means for performing signal processing on images or sound and converting to recording data;
   recording playback signal processing means for converting said data to media recording data for each basic recording unit according to specification of a recording medium;
   memory for storing said recording data for each said basic recording unit; and
   recording means for recording said media recording data to said recording medium;
   wherein, when recording is interrupted due to an external factor in the middle of a basic recording unit, the quantity of data placed in said memory exceeds the allowable recording capacity before said external factor is eliminated while data subsequent thereto are deleted sequentially; and
   wherein, when said external factor is eliminated, a quantity of dummy data, substantially equivalent to the quantity of the recording data of the basic recording unit for which said recording was interrupted, are recorded consecutively from the position on said recording medium at which said recording was interrupted and then recording data of the basic recording unit remaining in memory are recorded sequentially.

2. A data recording/playback method, comprising the steps of:
   performing signal processing on images or sound for converting to recording data;
   converting the data to media recording data for each basic recording unit according to specification of a recording medium;
   storing said recording data for each said basic recording unit; and
   recording said media recording data to said recording medium;
   wherein, when recording is interrupted due to an external factor in the middle of a basic recording unit, the quantity of data placed in said memory exceeds the allowable recording capacity before said external factor is eliminated, while data subsequent thereto are deleted sequentially; and
   wherein, when said external factor is eliminated, a quantity of dummy data, equivalent to the quantity of the recording data of the basic recording unit for which said recording was interrupted, are recorded consecutively from the position on said recording medium at which said recording was interrupted and then recording data of the basic recording unit remaining in memory are recorded sequentially.

* * * * *

UNITED STATES PATENT AND TRADEMARK OFFICE
CERTIFICATE OF CORRECTION

| | |
|---|---|
| PATENT NO. | : 7,620,299 B2 |
| APPLICATION NO. | : 11/150790 |
| DATED | : November 17, 2009 |
| INVENTOR(S) | : Ono et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this

Twenty-sixth Day of October, 2010

David J. Kappos
*Director of the United States Patent and Trademark Office*